United States Patent [19]
Ralston, Jr.

[11] Patent Number: 5,689,402
[45] Date of Patent: Nov. 18, 1997

[54] SCSI DOCKING ADAPTER

[75] Inventor: Richard Anthony Ralston, Jr., Shawnee Mission, Kans.

[73] Assignee: APS Technologies, Kansas City, Kans.

[21] Appl. No.: 691,430

[22] Filed: Aug. 2, 1996

Related U.S. Application Data

[63] Continuation of Ser. No. 220,168, Mar. 30, 1994, abandoned.
[51] Int. Cl.⁶ ........................................... H05K 5/00
[52] U.S. Cl. ..................... 361/686; 361/628; 361/631; 361/643; 361/733; 439/638
[58] Field of Search ........................... 361/628, 631–632, 361/638, 643, 686, 733, 683, 684, 647; 439/638, 928.1, 651, 52

[56] References Cited

U.S. PATENT DOCUMENTS

| | | | |
|---|---|---|---|
| 5,217,394 | 6/1993 | Ho | 439/620 |
| 5,318,449 | 6/1994 | Schoell et al. | 434/305 |

OTHER PUBLICATIONS

Macintosh Family Computers, Pin–Out Table, SCSI Connector—HDI–30.

*Primary Examiner*—Leo P. Picard
*Assistant Examiner*—Phuong T. Vu
*Attorney, Agent, or Firm*—Martin Korn

[57] ABSTRACT

A docking adapter includes a male HDI 30 type connector (for connecting to a "POWERBOOK" portable computer) and a female DB 25 type connector (for connecting via a SCSI bus cable to either a "MACINTOSH" personal computer or a SCSI external hard drive). The pins of the HDI type connector are electrically connected to the corresponding pins of the DB type connector. The adapter includes a switch having an actuated position for grounding pin 1 of the HDI type connector to "dock" the portable computer in a disk operating mode facilitating data transfer with the "MACINTOSH" over the SCSI bus. When not in the actuated position, the portable computer may be connected to and access the external hard drive over the SCSI bus. The adapter also includes a light emitting diode (LED) connected between the termination power pins of the DB and HDI connectors and ground to monitor for the presence of termination power on the SCSI bus.

11 Claims, 3 Drawing Sheets

SCSI DOCKING ADAPTER

This is a continuation of application Ser. No. 08/220,168 filed Mar. 30, 1994 now abandoned.

TECHNICAL FIELD

The present invention relates to computer systems and, in particular, to a combined SCSI docking adapter and termination power diagnostic device.

BACKGROUND OF THE INVENTION

Laptop-type computers (including notebook and other portable computers) have become increasingly more powerful in recent years, and thus are in high demand by persons for use both at the home/office and on the road. In addition, it is not unusual for a computer user to own both a personal computer at the home or office and a portable computer for travel. In such situations, the user may wish to configure a SCSI bus docking system to access an external hard drive at the home/office from the portable computer, or in the alternative configure a SCSI bus docking system to access the portable computer from the personal computer at the home/office. As is well known, these docking systems require special cabling and a means for diagnostically checking for the presence of termination power on the SCSI bus.

Reference is now made to prior art FIGS. 1a–1c wherein it is assumed that a user owns and wishes to interconnect via a SCSI bus a "MACINTOSH" personal computer 10, an external hard drive 12 and a "POWERBOOK" portable computer 14. The terms "MACINTOSH" and "POWERBOOK" are trademarks of Apple Computer, Inc. The SCSI bus connection between the "MACINTOSH" 10 and the external hard drive 12 of FIG. 1a requires a first type SCSI bus cable 16 with a male DB 25 type connector 18 on one end (for connection to the female DB 25 connector of the personal computer) and a male Centronics 50 connector 20 on the other end (for connection to the female Centronics 50 connector on the hard drive). This SCSI bus cable 16 is typically supplied by the manufacturer with the purchase of the external hard drive 12.

To facilitate complete docking inter-connectability with the "POWERBOOK" 14, the user must further expend a great deal of money to procure two more types of SCSI bus cables. The SCSI bus connection between the "MACINTOSH" 10 and the "POWERBOOK" portable computer 14 of FIG. 1b requires a second type SCSI bus cable 22 with a male DB 25 type connector 18 on one end (for connection to the female DB 25 connector of the personal computer) and a male HDI 30 type connector 24 with a grounded pin 1 (LINK.SEL) on the other end (for connection to the female HDI 30 connector on the portable computer). Finally, the SCSI bus connection between the "POWERBOOK" portable computer 14 and the external hard drive 12 of FIG. 1c requires a third type SCSI bus cable 26 with a male HDI 29 type connector 24' (HDI 30 with no ground on pin 1) on the one end (for connection to the female HDI 30 connector on the portable computer) and a male Centronics 50 connector 20 on the other end (for connection to the female Centronics 50 connector on the hard drive).

To insure proper operation of the SCSI bus connection in each docking configuration of FIGS. 1a–1c, the user must also spend additional money to acquire a diagnostic device 28 for determining whether termination power (TPWR) is present on the SCSI bus (pin 25 of the DB 25 connector, or pin 26 of the Centronics 50 connector). When termination power is not present, it must be supplied externally or the device connected to the SCSI bus must be internally terminated.

Accordingly, there is a need for an adapter for use in personal computer and portable computer SCSI bus interconnection configurations that reduces the required number of SCSI bus cable types and eliminates the need for a separate diagnostic device to test for the presence of termination power on the bus.

SUMMARY OF THE INVENTION

The present invention comprises a docking adapter having a first connector of the type for connecting with a corresponding connector on a portable computer, and a second connector of a selected type for connection to a SCSI bus. Proper selection of the connector type for the second connector to match the connector type on the personal computer eliminates the need for certain SCSI bus cable types in a complete docking system inter-connection. The pins of the first connector are wired to the corresponding function pins of the second connector. The docking adapter further includes a switch means having an actuated position for grounding the certain pin(s) on the first connector required for placing (docking) the portable computer in a disk operating mode when connected via the adapter and a SCSI bus cable to the personal computer. The docking adaptor further includes a diagnostic illumination means that monitors certain pins on the first and second connectors for the presence of termination power on the SCSI bus thus obviating the need for the separate purchase of a termination power sensing diagnostic device.

In particular, for inter-connecting a "MACINTOSH" personal computer, an external hard drive and a "POWERBOOK" portable computer, the first connector of the adapter comprises a male HDI 30 type connector and the second connector comprises a female DB 25 type connector. When actuated, the switch means grounds the LINK.SEL pin of the HDI type connector to "dock" the portable computer in a disk operating mode for connection to and data transfer with the "MACINTOSH" over a common DB 25—DB 25 SCSI bus cable via the docking adapter. When the switch is not in the actuated position, the portable computer may be connected to and access the external hard drive via the adapter advantageously using the same DB 25—Centronics 50 SCSI bus cable used to connect the personal computer to the hard drive. The illumination means comprises a light emitting diode (LED) connected between the termination power pins of the DB 25 connector and HDI 30 connector and ground, and is illuminated when termination power is present on the SCSI bus.

BRIEF DESCRIPTION OF THE DRAWINGS

A more complete understanding of the docking adapter of the present invention may be had by reference to the following Detailed Description when taken in conjunction with the accompanying Drawings wherein.

DETAILED DESCRIPTION OF THE DRAWINGS

Figure 2:
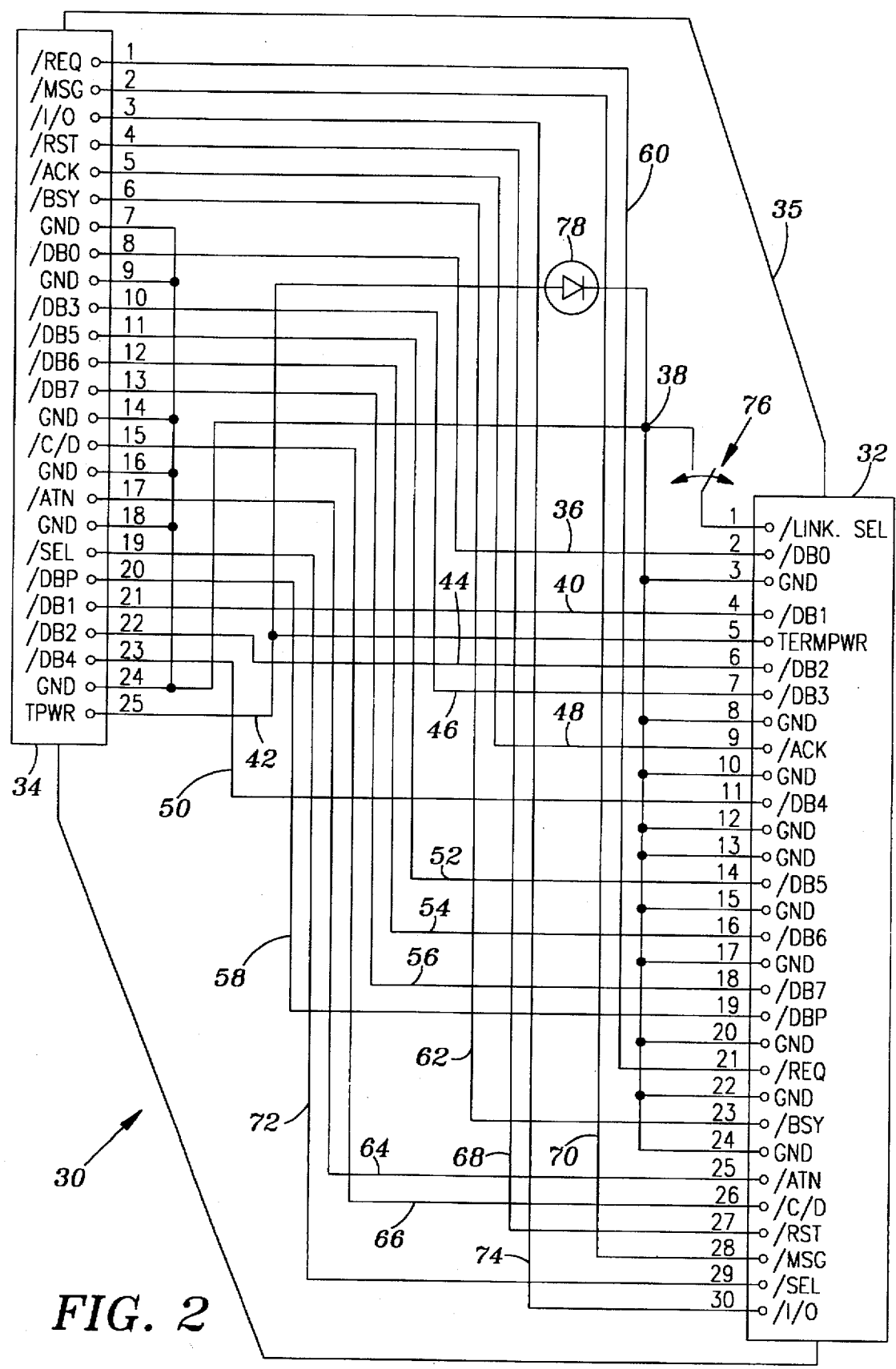
FIG. 2 is a schematic diagram of the docking adapter of the present invention.

Reference is now made to FIG. 2 wherein there is shown a schematic diagram of the docking adapter 30 of the present invention disclosed and described in connection with its preferred embodiment for use in inter-connecting a "MACINTOSH" 10, an external hard drive 12 and a "POWERBOOK" portable computer 14. It will, of course, be understood that the adapter of the present invention may be modified, as necessary, for use in providing interconnectability between other types of personal computers, hard drives and portable computers.

The docking adapter 30 includes a first connector 32 of the male HDI 30 type for connecting with the female HDI 30 type connector on the "POWERBOOK" portable computer. The docking adapter 30 further includes a second connector 34 of the female DB 25 type. A DB 25 type connector is chosen because the "MACINTOSH" personal computer includes a female DB 25 type connector. The connectors 32 and 34 are mounted on opposite sides of an adapter housing 35. The individual pins (numbered 1–30) of the first connector 32 are electrically connected within the housing 35 to the corresponding function pins (numbered 1–25) of the second connector 34. Table 1 herein sets forth, and references with respect to FIG. 2, the electrical wiring connections between the first (HDI 30) and second (DB 25) connectors 32 and 34, respectively.

TABLE 1

| HDI 30 Connector | | DB 25 Connector | | |
| --- | --- | --- | --- | --- |
| Pin # | Name | Pin # | Name | Ref.# |
| 1 | LINK.SEL | — | — | — |
| 2 | DB0 | 8 | DB0 | 36 |
| 3 | GND | * | GND | 38 |
| 4 | DB1 | 21 | DB1 | 40 |
| 5 | TERMPWR | 25 | TPWR | 42 |
| 6 | DB2 | 22 | DB2 | 44 |
| 7 | DB3 | 10 | DB3 | 46 |
| 8 | GND | * | GND | 38 |
| 9 | ACK | 5 | ACK | 48 |
| 10 | GND | * | GND | 38 |
| 11 | DB4 | 23 | DB4 | 50 |
| 12 | GND | * | GND | 38 |
| 13 | GND | * | GND | 38 |
| 14 | DB5 | 11 | DB5 | 52 |
| 15 | GND | * | GND | 38 |
| 16 | DB6 | 12 | DB6 | 54 |
| 17 | GND | * | GND | 38 |
| 18 | DB7 | 13 | DB7 | 56 |
| 19 | DBP | 20 | DBP | 58 |
| 20 | GND | * | GND | 38 |
| 21 | REQ | 1 | REQ | 60 |
| 22 | GND | * | GND | 38 |
| 23 | BSY | 6 | BSY | 62 |
| 24 | GND | * | GND | 38 |
| 25 | ATN | 17 | ATN | 64 |
| 26 | C/D | 15 | C/D | 66 |
| 27 | RST | 4 | RST | 68 |
| 28 | MSG | 2 | MSG | 70 |
| 29 | SEL | 19 | SEL | 72 |
| 30 | I/O | 3 | I/O | 74 |

*GND pins on DB 25 connector are pins 7, 9, 14, 16, 18 and 24. Reference numeral 38 refers to a common ground wire connecting all GND pins of each connector in the adapter 30.

The docking adapter 30 further includes a switch 76 (shown not actuated) connected between the docking mode select pin (pin 1-LINK.SEL) of the first connector 32 and the common ground 38. Actuation of the switch 76 grounds the docking mode select pin of the first connector 32 to place a "POWERBOOK" portable computer connected to first connector 32 in a disk operating (docking) mode. The docking adapter 30 also includes a light emitting diode (LED) 78 connected between the termination power pins 5 and 25 of the first and second connectors 32 and 34, respectively, and the common ground 38. The presence of termination power on either termination power pin 5 (TERMPWR) of the first connector 32 or termination power pin 25 (TPWR) of the second connector 34 will cause the LED 78 to illuminate. Thus, the docking adapter 30 further functions as a device capable of conducting a termination power diagnostic test on the SCSI bus cable.

Figure 3A:
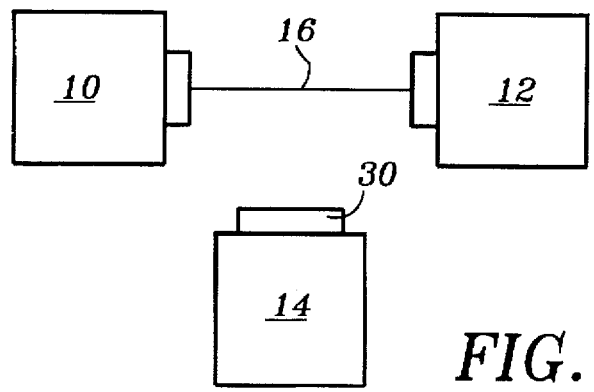
FIGS. 3a–3c illustrate the use of the docking adapter of the present invention to inter-connect a "MACINTOSH", an external hard drive and a "POWERBOOK" portable computer.
Figure 3B:
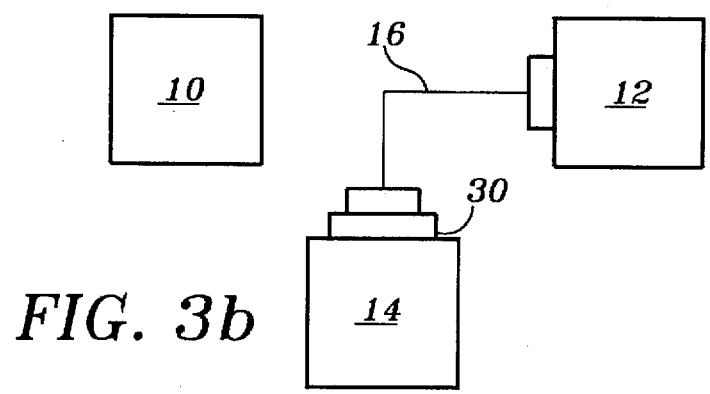
Figure 3C:
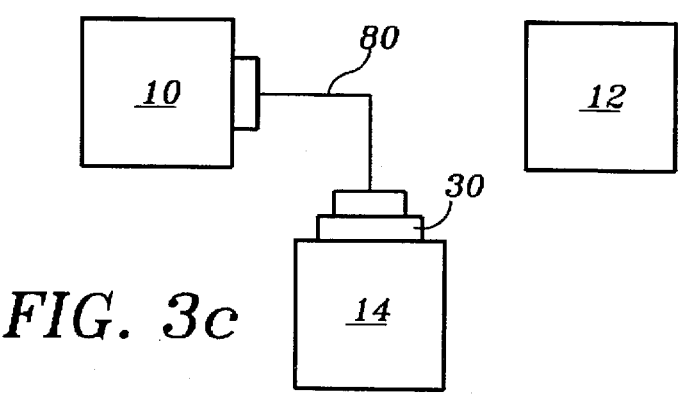

Reference is now made to FIGS. 3a–3c to illustrate the use of the docking adapter 30 of the present invention to inter-connect a "MACINTOSH" 10, an external hard drive 12 and a "POWERBOOK" portable computer 14.

Figure 1A:
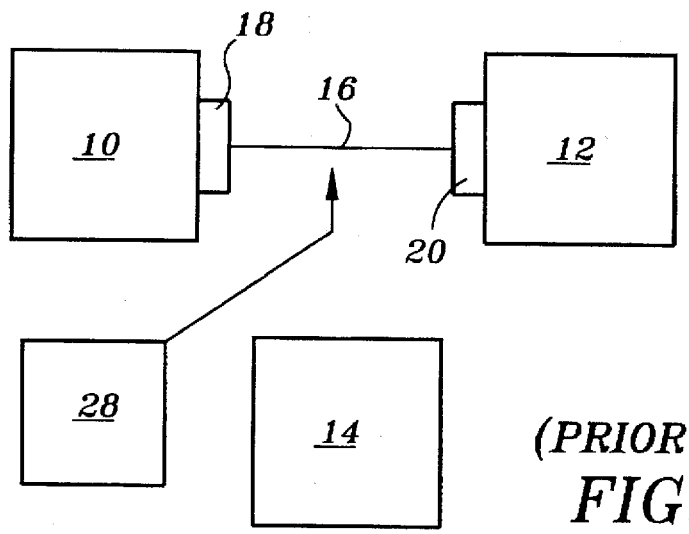
FIGS. 1a–1c illustrate the prior art cabling and diagnostic device requirements for inter-connecting a "MACINTOSH", an external hard drive and a "POWERBOOK" portable computer.
Figure 1B:
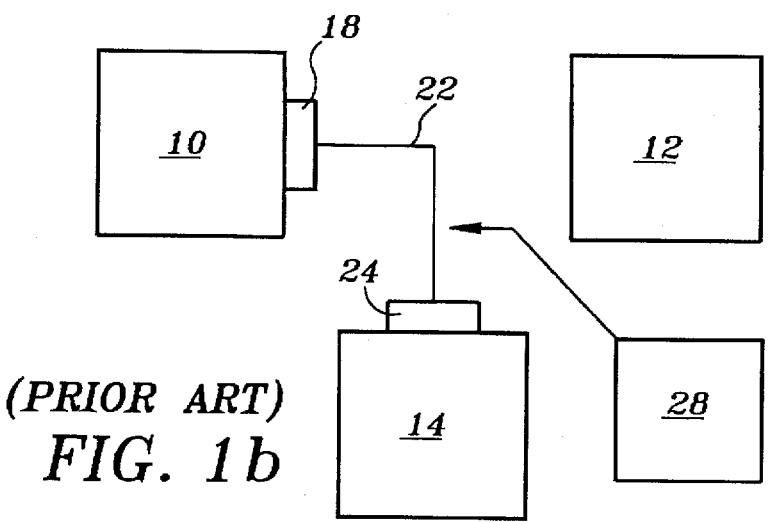
Figure 1C:
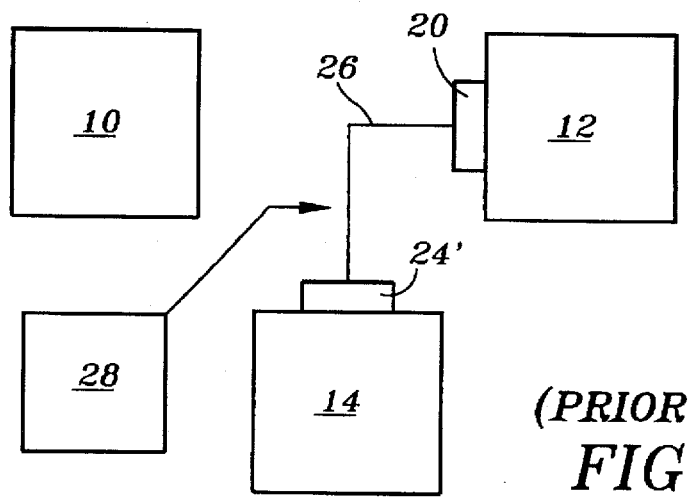

In FIG. 3a, the connection between the "MACINTOSH" 10 and the external hard drive 12 utilizes the standard male DB 25—male Centronics 50 cable 16 as shown in FIG. 1a.

In FIG. 3b, the connection between the "POWERBOOK" portable computer 14 and the external hard drive 12 utilizes the docking adapter 30 connected to the portable computer, with the standard male DB 25—male Centronics 50 cable 16 shown in FIG. 3a advantageously used again for connection between the adapter and the hard drive. When configured in this manner, the switch 76 remains in the not actuated position. The LED 78 will be illuminated if either the external hard drive 12 or the "POWERBOOK" portable computer 14 provides termination power. If the LED 78 is not illuminated, the user must internally terminate the hard drive 12, or supply an external source of termination power to the SCSI bus.

In FIG. 3c, the connection between the "MACINTOSH" 12 and the "POWERBOOK" portable computer 14 utilizes the docking adapter 30 connected to the portable computer, and a standard male DB 25—male DB 25 cable 80 for connection between the adapter and the personal computer. When configured in this manner, the switch 76 is placed in the actuated position to ground docking mode select pin (LINK.SEL) of the first connector 32. This places the portable computer 14 in a disk operating (docking) mode that enables the portable computer to be daisy chained to the "MACINTOSH" 10 and accessed like an external hard drive 12. The LED 78 will be illuminated because the "MACINTOSH" 10 provides termination power.

With the docking adapter 30, the user need only purchase two SCSI bus cables: a male DB 25—male Centronics 50 cable 16, and a male DB 25—male DB 25 cable 80 for complete inter-connectability. Furthermore, there is no need to purchase a separate termination diagnostic device as such functionality is already provided with the LED 78 in the docking adapter 30.

Figure 4:
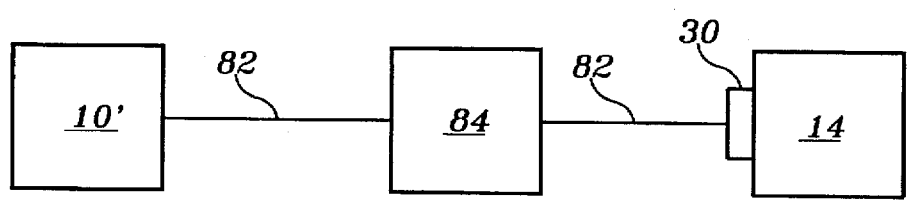
FIG. 4 illustrates the use of the docking adapter to inter-connect a "POWERBOOK" portable computer and a DOS based personal computer.

Reference is now made to FIG. 4 wherein the docking adapter 30 is shown enabling a "POWERBOOK" portable computer 14 to be docked to an external SCSI bus 82 for a DOS compatible personal computer 10'. The "POWERBOOK" portable computer 14 is hooked into the SCSI bus 82 as the last device on the external SCSI daisy chain. As many other DOS compatible SCSI peripherals 84 as are needed may be hooked into the SCSI bus 82 between the personal computer 10' and the portable computer 14. When configured in this manner, the switch 76 of the adapter 30 is actuated to ground the docking mode select pin (LINK.SEL) of the first connector 32 and place the portable computer 14 in a disk operating (docking) mode. In this mode, data transfers between the "POWERBOOK" portable computer 14 and the DOS-type personal computer 10' over the SCSI bus 82 are permissible. It will, of course, be understood that the personal computer 10' must include an ASPI compatible host bus adapter card to facilitate the data transfer.

Although only one embodiment of the docking adapter of the present invention has been illustrated in the accompanying Drawings and described in the foregoing Detailed Description, it will be understood that the invention is not limited to the embodiment disclosed, but rather is capable of numerous rearrangements and modifications without departing from the scope of the invention. In particular, it will be understood that the type of connectors used and interconnections therebetween may be changed to configure the docking adapter for use in various types and kinds of computer systems.

I claim:

1. A docking adapter for a portable computer comprising:

a first connector configured for connection to a portable computer, the first connector having a plurality of function pins including a docking mode select pin, the first connector being connected to the portable computer;

a second connector configured for connection to a communications bus, the second connector including a plurality of function pins;

a plurality of electrical wiring connections interconnecting the function pins of the first connector to the function pins of the second connector in a selected pattern;

a common ground; and a switch connected into the electrical wiring connection to the docking mode select pin, said switch having a first position connecting the docking mode select pin to the common ground to place the portable computer connected to the first connector in a docking mode with a personal computer via the communications bus, and a second position disconnecting the docking mode select pin from the common ground connecting an external storage device for data access by the portable computer via the communications bus.

2. The docking adapter of claim 1 wherein the adapter further comprises means for monitoring the presence of termination power and providing a visual indication of termination power.

3. The docking adapter of claim 2 wherein the means for monitoring the presence of termination power and providing a visual indication of termination power comprises an LED.

4. The docking adapter of claim 1 wherein the first connector comprises a male HDI 30 type connector.

5. The docking adapter of claim 1 wherein the second connector comprises a female HDI 30 type connector.

6. A docking adapter for a portable computer comprising:

a first connector configured for connection to a portable computer, the first connector having a plurality of function pins including a docking mode select pin the first connector being connected to the portable computer;

a second connector configured for connection to a communications bus, the second connector including a plurality of function pins;

a plurality of electrical wiring connections interconnecting the function pins of the first connector to the function pins of the second connector in a selected pattern;

a common ground;

a switch connected into the electrical wiring connection for the docking mode select pin, said switch having a first position connecting the docking mode select pin to the common ground to place the portable computer connected to the first connector in a docking mode with a personal computer via the communications bus, and a second position disconnecting the docking mode select pin from the common ground to connect an external storage device for data access by the portable computer via the communications bus; and means connected into one of the electrical wiring connections for monitoring the presence of termination power to the first connector or to the second connector and for providing a visual indication of termination power.

7. The docking adapter of claim 6 wherein the means for monitoring the presence of termination power and providing a visual indication of termination power comprises an LED.

8. The docking adapter of claim 6 wherein the first connector comprises a male HDI 30 type connector.

9. The docking adapter of claim 6 wherein the second connector comprises a female HDI 30 type connector.

10. A docking adapter for a portable computer comprising:

a first connector comprising a male HDI 30 type connector configured for connection to a portable computer, the first connector having a plurality of function pins including a docking mode select pin the first connector being connected to the portable computer;

a second connector comprising a female HDI 30 type connector configured for connection to a communications bus, the second connector including a plurality of function pins;

a plurality of electrical wiring connections interconnecting the function pins of the first connector to the function pins of the second connector in a selected pattern;

a common ground;

a switch connect into the electrical wiring connection to the docking mode select pin, said switch having a first position connecting the docking mode select pin to the common ground to place the portable computer connected to the first connector in a docking mode with a personal computer via the communications bus, and a second position disconnecting the docking mode select pin from the common ground to connect an external storage device for data access by the portable computer via the communications bus; and means connected into one of the electrical wiring connections for monitoring the presence of termination power to the first connector or to the second connector and for providing a visual indication of termination power.

11. The docking adapter of claim 10 wherein the means for monitoring the presence of termination power and providing a visual indication of termination power comprises an LED.

* * * * *